Dec. 4, 1956   J. E. PENICK ET AL   2,773,012
METHOD AND APPARATUS FOR CONTINUOUS PERCOLATION OF OILS
Filed July 17, 1951   2 Sheets-Sheet 1
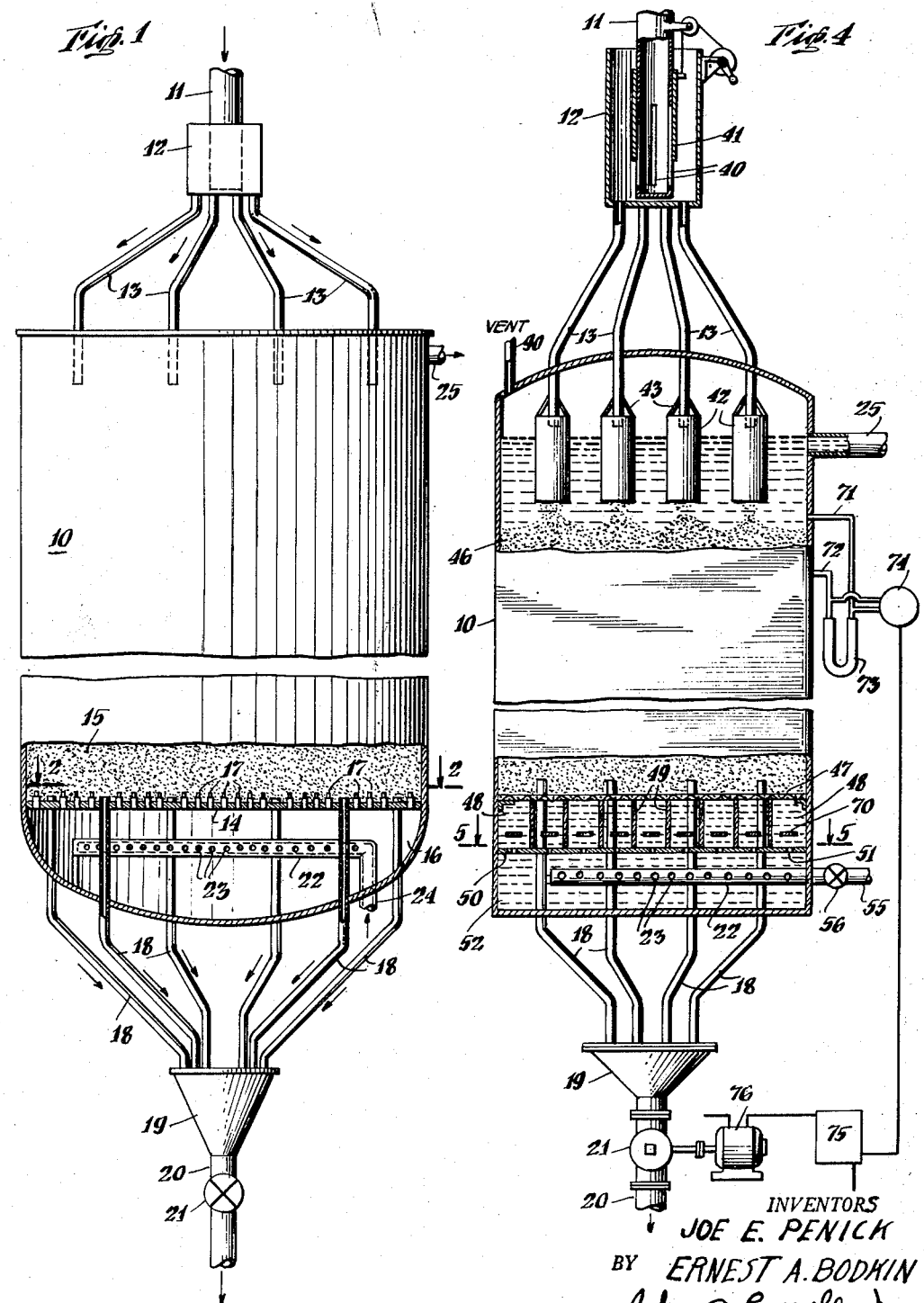
INVENTORS
JOE E. PENICK
BY ERNEST A. BODKIN
John A. Crowley Jr.
ATTORNEY Dec. 4, 1956 J. E. PENICK ET AL 2,773,012
METHOD AND APPARATUS FOR CONTINUOUS PERCOLATION OF OILS
Filed July 17, 1951 2 Sheets-Sheet 2
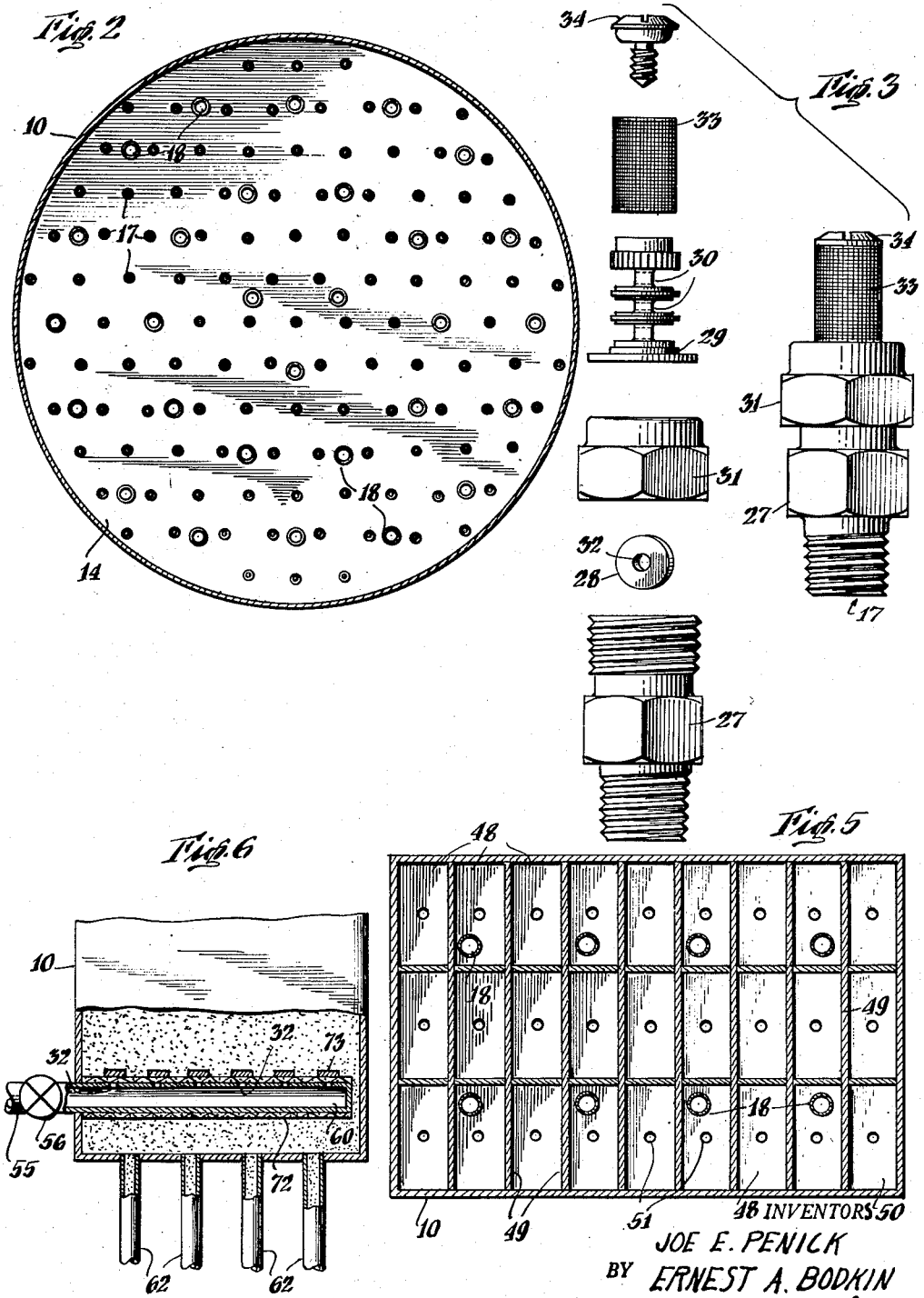
INVENTORS
JOE E. PENICK
ERNEST A. BODKIN
BY John A. Crowley, Jr.
ATTORNEY

United States Patent Office 2,773,012
Patented Dec. 4, 1956

2,773,012

METHOD AND APPARATUS FOR CONTINUOUS PERCOLATION OF OILS

Joe E. Penick, Woodbury, and Ernest A. Bodkin, Pitman, N. J., assignors to Socony Mobil Oil Company, Inc., a corporation of New York Application July 17, 1951, Serial No. 237,266

11 Claims. (Cl. 196—47)

This invention relates to a process for treating lubricating oils and lighter petroleum fractions of low asphalt content with solid adsorbents for the purpose of removing small amounts of impurities or undesirable contaminants therefrom. Typical of the oil treating processes to which this invention is particularly applicable are decolorization, neutralization, removal of suspended colloidal or dissolved impurities such as carbon or coke or oxygen and nitrogen-containing impurities and other gum forming compounds and improvement of demulsibility properties of the oil. This invention is also applicable to processes for separation of liquid materials by adsorption, to solvent extraction processes, and to adsorbent treating and washing processes.

Recently there has been developed a new continuous process for treating lubricating oils with an adsorptive material, which process involves the cyclic circulation of an adsorbent material in palpable particulate form through oil treating, solvent washing, drying and combustion zones. Such a process is described and claimed in Serial Number 177,408, filed in the United States Patent Office on August 3, 1950. In the treating zone of that process the oil is passed upwardly and countercurrently through a columnar mass of downwardly gravitating adsorbent to effect the desired treatment of the oil. This invention deals particularly with a method and apparatus for introducing liquid oil charge into the treating zone of a continuous percolation process of that type. The invention is also applicable to the adsorbent washing stage of the continuous percolation process.

It has been found that in order to attain proper decolorization of the oil and efficient utilization of the adsorbent in the treater of the continuous percolation process, a true uniform countercurrent contacting of the oil and adsorbent must be maintained throughout the treating zone. This means that difficulties of channeling of the oil or adsorbent through the columnar mass, and localized disturbances and disruption of the columnar mass must be avoided. It has been found that in treaters of commercial size which may range upwards from 8 feet in diameter, the manner in which liquid oil is introduced into the columnar mass has a very pronounced effect upon the creation and upon the accentuation of the above-mentioned difficulties. In fact it was found that unless the liquid oil charge was introduced into the columnar mass in a very particular manner which is described hereinbelow, such difficulties as non-uniform flow and channeling of the oil in various sections of the columnar mass, disruption of the columnar mass and interference with true countercurrent contacting, channeling of the adsorbent, and excessive attrition and breakage of the adsorbent were encountered.

A major object of this invention is to provide in a continuous percolation process an improved method and apparatus for supplying liquid oil to the treating zone which method and apparatus avoids the difficulties above-mentioned.

Another object is to provide an improved method and apparatus for conducting countercurrent contacting of a liquid material and a columnar mass of downwardly gravitating adsorbent of palpable particulate form.

A specific object is the provision in a process wherein petroleum oil is caused to flow upwardly through a columnar mass of downwardly gravitating adsorbent of palpable particle form of an improved method and apparatus for supplying liquid oil charge into the lower portion of the columnar mass, which avoids channeling of the oil or adsorbent material flow in the treating zone.

Another object is the provision in a process for removing oily material from a column of adsorbent by countercurrent washing with a suitable solvent of an improved method for distributing the solvent into the column.

These and other objects of this invention will become apparent from the following description of the method and apparatus.

This invention in a preferred form involves a method and apparatus wherein a suitable adsorbent material is caused to move downwardly through a treating zone as a columnar mass of gravitating particles. A liquid oil charge is supplied continuously into the lower section of the column in a plurality of spaced uniformly distributed streams, the amount of column cross-section served by each inlet stream being maintained below a critical minimum above which uniform contacting cannot be obtained. In a preferred form of this invention a column of adsorbent is maintained in the upper portion of the treating zone and a body of liquid oil charge is maintained in the lower section thereof below the column and communicating therewith only through a plurality of uniformly distributed restricted passages the outlet side of which are baffled and screened for purposes of liquid flow dispersal and adsorbent exclusion.

In conducting this method the adsorbent employed should be made up of palpable particles of size within the range about 4–100 mesh and preferably about 10–60 and still more preferably 15–30 mesh by Tyler standard screen analysis. The particles may take the form of pellets, capsules, pills, spheres or the like or granules of irregular shape such as are obtained from grinding and screening. The terms "adsorbent in palpable particulate form" and "palpable particle form adsorbents" as employed herein in describing and in claiming this invention are intended to generically cover particles of any or all of these shapes having substantial size as distinguished from finely divided particles. The pore structure of the preferred adsorbents are of such that while micropores are present, substantially more than 30 percent of the pore volume and preferably more than 60 percent of the total pore volume is occupied by macropores (i. e., pores having radii greater than 100 Angstrom units). Typical adsorbents which may be employed are fuller's earth, bauxite, bentonite and bone char, charcoal, magnesium silicate, heat and acid activated kaolin, and activated carbon. Synthetic silica or alumina or silica-alumina gel adsorbents and the like may be employed but preferably the preparation thereof should be controlled to provide a pore structure similar to that of the clay type adsorbents wherein substantially more than 30 percent of the total pore volume is occupied by macropores. Gels of this type are described in United States Patent No. 2,188,007, issued January 23, 1940. It should be understood, however, that by proper control of the operation conditions, adsorbents of the synthetic gel type or otherwise having mostly micropores and less than 30 percent macropores may be employed in the process of this invention although with somewhat inferior results when used for lubricating oil purification. On the other hand, gels of this latter type have been found to give superior results in the treatment of distillate fuel oils by the method of this invention. Such adsorbents of this latter type are disclosed in United States Patents Nos. 2,384,946 and 2,106,744. The invention in its broadest form is intended to be applicable to adsorbents of this type as well as the preferred adsorbents of larger pore structure.

The invention may be most readily understood by reference to the drawings in which Figure 1 is an elevational view, partially in section, of a preferred form of this invention; Figure 2 is a horizontal cross-sectional view taken along line 2—2 of Figure 1; Figure 3 shows pictorially the construction details of an important element of the apparatus shown in Figures 1 and 2; Figure 4 is an elevational view, partially in section, of a modified form of the invention; Figure 5 is a horizontal cross-sectional view taken along line 5—5 of Figure 4; and Figure 6 is a vertical view, partially in section, of a portion of another modification of the invention. All of these drawings are highly diagrammatic in form.

Turning now to Figure 1, there is shown a treating vessel 10 which may be of any desired suitable cross-sectional shape. An inlet pipe 11 for adsorbent feed extends downwardly into a flow regulator and divider which will be described in more detail in connection with Figure 4. The adsorbent feed enters the upper section of the treater through a plurality of pipes 13. The adsorbent then passes downwardly through the treating zone as a columnar mass of gravitating particles countercurrently to the liquid hydrocarbons or petroleum oil which is percolated upwardly through the column of adsorbent and is withdrawn from the upper section of the treater as treated or decolorized product via pipe 25. The spent adsorbent which in the case of a decolorization process will contain a carbonaceous deposit and a certain amount of sorbed and occluded oil is withdrawn from the bottom of the column and the lower section of the treating zone through a plurality of pipes 18 which are uniformly spaced and arranged over the entire cross-section of the treating vessel. The pipes combine proportionately in the merging chamber 19 and the spent adsorbent flows downwardly via pipe 20 to a suitable draining or solvent washing apparatus (not shown). The oil recovery and adsorbent revivification portion of the continuous percolation system is disclosed in application Serial Number 177,408, filed in the United States Patent Office August 3, 1950. The rate of adsorbent withdrawal from the treater is controlled by valve 21 which may be a mechanically driven measuring or star valve. Liquid hydrocarbon for contacting or treatment is introduced into the lower section of the treater via pipe 24 to closed distributing conduits of which one, 22, is shown. The oil issues from conduit or conduits 22 via orifices 23 into a plenum or oil distributing space 16 defined in the lower end of vessel 10 by means of the horizontal partition 14. Thus, there is maintained below the column of adsorbent 15 a body or column of liquid which communicates with the adsorbent column only through a plurality of restricted passages 17 which are uniformly distributed across the partition so as to provide a uniform distribution of passage area across the entire horizontal cross-sectional area of the treater at a common level. The arrangement of the restricted orifice passages 17 and the adsorbent outlet pipes 18 which terminate on the open upper ends just above the partition 14 is shown in Figure 2 in which like elements bear the same numerals as in Figure 1.

The construction of the restricted passage-forming members 17 is shown in Figure 3. It will be noted that each of the members 17 comprises a nozzle made up of several parts. The body portion of the nozzle 27 is in the form of a male coupling or connecter or short nipple, one end of which is screwed into the partition 14. A button type orifice plate 28 rests on a shoulder (not shown) in the upper portion of the connecter 27. A flanged upright member 30 having perforations in its sides for oil passage serves as a diffuser and principally as a support member for the screw 34 and the screen 33. The screen 33 fits around the upright portion of the portion of the diffuser 29 and is held in place by the head flange of screw 34. The diffuser in turn rests on top of the orifice plate and is held to the connector by means of nut 31 which is of the type employed in brass tube compression fittings. Liquid oil is forced through the orifice 32 by pressure in chamber 16 and issues as a high velocity stream which impinges on the end of screw 34 so that the stream is deflected and dispersed and the linear velocity reduced. The screen 33 has a passage area substantially greater than orifice 28 and serves merely as a shield to exclude adsorbent particles from the nozzle and not as a means for dispersing the flow. The improved distributing nozzle described hereinabove is the subject of claims in copending related application Serial Number 237,265, filed in the United States Patent Office on July 17, 1951.

In order to insure equal distribution of the flow through all the nozzles 17, it is important that the liquid encounter substantial pressure drop in passing therethrough. It has been found that the orifices should be so sized, considering the desired oil throughput, that when the oil flow rate is that desired for the treating operation the pressure drop due to flow through each nozzle is at least equal to 4 times and preferably 10 times the velocity head (i. e., $\Delta P$ due to oil flow) of the oil flowing across the distributing space or plenum chamber to the nozzle plus at least one-fourth of and preferably equal to the frictional resistance to liquid flow through the adsorbent column (i. e., pressure drop due to oil flow through the length of the column, exclusive of hydrostatic head). Where the oil is presented to each orifice or restricted passage, or passageway as hereinafter defined, at the same pressure, and where the pressure head due to oil flow across the plenum space is negligible, as compared with the pressure drop due to flow through the adsorbent column, the pressure drop through each restricted passageway should be at least ¼ and preferably equal to the pressure drop due to oil flow through the adsorbent column.

The size of the orifices as controlled by the above considerations is such that the sum of the horizontal cross-sectional areas of all of the orifices is a very small fraction of the vessel cross-section, usually less than one percent. The linear velocity of the liquid issuing from the orifices is therefore relatively high. In fact, if the oil streams are permitted to flow directly into the adsorbent column at the velocity involved, local disturbances are created in the column which promote channeling of the oil and adsorbent flow throughout the bed. In addition, the direct impingement of high velocity liquid streams on the adsorbent particles results in breakage and excessive attrition of the solid particles. For this reason, according to the preferred form of this invention, the streams issuing from the orifices are baffled to disperse or spread the stream flow and thereby to effect reduction in the linear velocity of liquid flow. It has been found that the actual linear velocity of the liquid flow as it actually enters into initial contact with the adsorbent in the column thereof should be less than 2.0 feet per second and preferably less than 0.7 feet per second.

The superficial velocity of the liquid oil through the treater (i. e., based on oil at treating temperature and free cross-section area of the treater when empty) should be controlled below that which would interfere with the downward direction of adsorbent particle flow or disrupt the adsorbent column. While some expansion of the adsorbent column due to oil flow may be tolerated, oil velocities which are so high as to cause the adsorbent particles to move upwardly in the treating zone should be avoided since such high velocities would prevent true counter-current contacting of the oil and adsorbent with resultant decrease in the efficiency of the treating process. In general, the adsorbent particles touch each other as they move through the treating zone and the rate of flow is controlled by the rate of adsorbent withdrawal from the column.

It has been found that the amount of column area served by each oil inlet (i. e., square feet of column cross-section per inlet) should not exceed a critical maximum which is a function of the column height, otherwise uniform contacting of the oil and adsorbent is not effected. Thus, for an adsorbent column 57 x 8 inches in cross-section and 12 feet high, the results shown in Table I were obtained in a process for continuously decolorizing petroleum stocks over 30–60 mesh fuller's earth.

Table I

| Horizontal Cross-Sectional Area of Adsorbent Column Per Oil Inlet to Column | Oil Superficial Velocity Through Column, Cu. ft./Sq. ft./hr. | Relative Decolorizing Efficiency |
|---|---|---|
| Sq. Inches: | | |
| 456 | 4 | 0.52 |
| 64 | 4 | 1.0 |
| 64 | 2 | 0.97 |
| 16 | 4 | 1.0 |
| 16 | 2 | 0.97 |

It has been found that the minimum required number of oil inlets (i. e., the maximum allowable column area per inlet) varies dependent upon the height of the adsorbent column. For example, where the column height was three feet, a very low treating efficiency resulted even when the column area per inlet was as low as 35 square inches. It has been found that the critical maximum cross-sectional area of the column per restricted oil inlet passage is related to the column height substantially in the manner defined by the equation $A'=1.49\ L^{1.97}$, where $A'$ is the cross-sectional area of adsorbent column in square inches per inlet and L is the adsorbent column height in feet above the oil inlet. Thus, the critical minimum number of restricted oil inlet passages for any treating zone of the type here involved is defined by the equation $$N=\frac{96.7A}{L^{(1.97)}}$$

where A is the horizontal cross-sectional area in square feet of the adsorbent column and L is its vertical length in feet above the restricted oil inlet passages. It has further been found that for best operation there should be one restricted oil inlet passage for each $A'$ square inches of adsorbent column cross-section where $A'$ is defined by the equation $A'=1.21\ L^{1.60}$. In other words, the number of restricted oil inlet passages should be approximately that defined by the equation $$N=\frac{119A}{L^{(1.60)}}$$

On the other hand, the number of inlets preferably should not exceed that defined by the equation $$N=\frac{537A}{L^{(1.20)}}$$

In one of its broader forms, this invention is directed broadly to the improvement in a continuous countercurrent adsorbent-oil contacting process of the type here involved of introducing the oil charge in a plurality of spaced apart streams uniformly distributed over the vessel cross-section, the number of said streams being at least the critical minimum as defined hereinabove below which proper contacting efficiency is not obtained. In its broadest aspects this phase of the invention is not considered as being limited in scope to the particular further novel improvements disclosed herein, which deal primarily with the manner in which each stream is introduced into the adsorbent column.

A somewhat modified form of this invention is shown in Figures 4 and 5, like members in these drawings and those of Figures 1–3 being given like numerals. Referring to Figure 4, it will be noted that the adsorbent feed pipe 11 is closed on its lower end and that a plurality of vertical slots 40 are provided around its lower end. These slots may be covered to any desired extent by means of the slidable sleeve 41 so that the solid flow may be restricted to a fixed maximum rate. The solid material issuing from the slots 40 enters the upper ends of the feed pipes 13 which are arranged in a ring around the bottom of chamber 12 so as to receive equal portions of the total flow. The divider and throttling device is the subject of claims in application Serial Number 237,264, filed in the United States Patent Office on July 17, 1951. The adsorbent from pipes 13 drops into the open ends of the vertical soaking tubes 42 which hang from pipes 13 by means of straps 43. The soaking tubes extend down from a level above the body of treated liquid 45 to a level shortly above the surface level of the columnar mass 46. The adsorbent drops by free fall through the tubes 42 and through the intervening body of oil 45 onto the column surface. In this manner, the air, gas or vapor is removed from the adsorbent, plugging of feed tubes with wet adsorbent is avoided and the adsorbent is continuously supplied uniformly over the entire cross-sectional area of the surface of column 46 without serious entrainment of adsorbent particles in the treated liquid leaving via pipe 25. The air is displaced from the adsorbent by liquid oil in the lower portions of tubes 42 and passes upwardly through the tubes to be withdrawn from the treater via vent 90. The soaking tubes and the general method of feeding adsorbent above described is the subject of claims in copending application Serial Number 237,268, filed in the United States Patent Office on July 17, 1951.

A screen 47 is supported across the lower section of the treater a substantial distance above its lower end. This screen may be of the usual wire mesh type or may take the form of a perforated plate or any suitable foraminate partition which is pervious to liquid flow therethrough but impervious to the adsorbent particles. A vertical section of the vessel below the screen 47 is divided or honeycombed into a plurality of side by side vertical passages 48 preferably of substantially equal horizontal cross-sectional area, by means of criss-cross vertical partitions 49 which terminate on their upper ends at the screen and on their lower ends at a common level above the lower end of the vessel 10. This arrangement may be more clearly understood by reference to Figure 5 in connection with Figure 4. A partition 50 extends across the vessel so as to close off the lower ends of passages 48. A plurality of orifices 51 are provided in the partition 50, one orifice for each passage 48 but the area of the orifices should be so proportioned as to permit flow into the passages 48 amounts of liquid proportional to the areas of vessel cross-section occupied by the upper ends of the passages 48. Thus, where the passages are of equal area at the screen level the orifices should be of equal size or sized to permit flow of equal amounts of oil to each passage from the plenum space 52 provided below partition 50. The orifices 51 correspond in function to the orifices 32 shown in Figure 3. In place of orifices, short nipples of restricted internal diameter may be employed. It will be understood that the terms "restricted passages" and "restricted passageways" as employed herein in claiming this invention are intended to broadly cover such nipples, nozzles, orifices, slots and equivalent means for accomplishing the function discussed hereinabove. Button type baffle plates 70 of larger lateral dimension than the orifices 32 are positioned immediately over the orifices so as to break up the velocity head of the liquid issuing from the orifices and promote uniform upward liquid flow across the area of the passages 48. Liquid oil feed is admitted to the space 52 from inlet conduit 55 and header 56 through a plurality of spider pipes 22 having orifices therein. If desired, the liquid may be alternatively supplied to the space 52 through one or more pipes opening directly into the space through the housing wall.

The operation is similar to that already described, a column of absorbent being maintained above a column of liquid oil from which absorbent is excluded with communication between the two columns only through restricted passages. The surface level of the column 46 is measured and indicated by measurement of differential pressure between two points vertically spaced a short distance apart at the general desired elevation for the column surface level. A change in column surface level is reflected by a change in differential pressure as measured at taps 71 and 72. This is indicated on a manometer 73. Also, the differential pressure change may be caused by suitable instruments 74 and 75 to activate a motor 76 which drives the positive discharge valve 21. If desired, other suitable level measuring devices may be employed to indicate and control the column surface level. The above described method for level control is the subject of claims in Serial Number 237,190, filed in the United States Patent Office on July 17, 1951. A suitable alternative method and apparatus for measuring and controlling the column surface level is disclosed in application Serial Number 237,189, filed in the United States Patent Office on July 17, 1951.

If desired, the apparatus for liquid introduction described in connection with Figure 4 may be modified by elimination of the partition 50 and substitution in its place a plurality of closed conduits with orifices therein uniformly spaced and distributed in the vessel below the lower ends of the passages 48.

It is believed that the oil inlet arrangement involving the means defining a plenum chamber with orifices therein uniformly distributed over the treater cross-section and with deflector baffles to disperse the flow from the orifices and screens to exclude absorbent from the orifices and plenum chamber is in itself basically new independently of the further improvements disclosed hereinabove. A modified application of this invention omitting some of the further improvements employed in the preferred form of the invention is shown in Figure 6. Here the liquid oil from the main inlet conduit 55 and header 56 enters through a plurality of horizontally spaced pipes 60, of which only one is visible in the drawing. These pipes are uniformly distributed with respect the vessel cross-section at a common level. The pipes 60 are closed on the ends thereof which terminate within the vessel, and contain orifices 32 so arranged as to be distributed uniformly over the entire cross-sectional area of treater 10. A screen 72 is wrapped around each pipe 60 and a button type baffle 73 is welded to the screen immediately in front of each orifice. While the orifices are shown on the upper sides of the pipes 60, they may be provided along the bottom or sides of the pipes if desired. In this form of the invention, the adsorbent is withdrawn from the column below the level of liquid introduction via pipes 62 rather than from the bottom of the adsorbent column and through the body of liquid therebelow via confined passages 18 as shown in Figure 4.

The operating conditions in the treater will, of course, vary depending upon the particular adsorbent employed and hydrocarbon stock being treated. In general, the superficial velocity of the oil flow through the column is within the range 0.5–20 feet per hour and preferably 1–10 feet per hour (based on oil at treating temperature and free cross-sectional area of the treater when empty of adsorbent). The adsorbent column length may range from about 5 to 50 feet and preferably from about 10–20 feet. The liquid viscosity under treating conditions should fall within the range about 0.2 to 500 centipoises, a viscosity of about 5 centipoises being preferred. The adsorbent to liquid product weight ratio for decolorizing petroleum oils ranges from about .015 to 6.00 and preferably .03 to 2.40 parts of adsorbent by weight per part of oil products. The linear rate of adsorbent flow through the treater should be within the range about .0125 to 100 and preferably .05 to 20 feet per hour.

As an example of this invention, an apparatus was constructed in the manner disclosed in Figures 1–3. The treater was 8 feet in diameter and in operation the length of adsorbent column above the partition 14 was about 17 feet. One hundred and fifteen nozzles 17, spaced uniformly about 8 inches apart were provided in partition 14. Each assembled nozzle measured only about 2 inches in height and ¾ inch in overall lateral dimensions. The orifice in each nozzle was .086 inch in diameter. The screen was of about 50 mesh Tyler. The oil feed was distributed into the plenum space by means of a single pipe connecting through the vessel shell into the plenum space 16. In a typical operation, a Mid-Continent base petroleum lubricating oil mixed with naphtha was passed through the treater at a rate of 625 barrels per day. The superficial oil velocity in the percolation vessel was about 2.92 ft./hr. and the liquid viscosity under the treater condition of 77° and 11.5 pounds per square inch pressure was about 5.2 centipoises. The oil feed had a color of 100 Lovibond and the treated oil product had color of 44 Lovibond. The adsorbent to oil ratio on a weight basis was about .074. Fuller's earth having a nominal mesh range of 15–30 by Tyler standard screen analysis was used as the adsorbent.

It is intended to cover all changes and modifications of the examples of the apparatus and operation of this invention herein chosen for purposes of disclosure, which do not constitute departures from the spirit and scope of the invention.

We claim:

1. A method for effecting countercurrent contact with a moving adsorbent and liquid hydrocarbons which remain in the liquid phase during the contacting which comprises, passing an adsorbent in palpable particle form downwardly as a column of gravitating particles through a confined treating zone, supplying the liquid hydrocarbon feed to at least one plenum space near the lower end of said column, ejecting the liquid feed from said plenum space through a plurality of uniformly spaced flow restricting passages whereby a plurality of liquid streams are formed and directing said streams into the lower section of said column, the number of said streams, N, depending upon the height, L, in feet and the horizontal cross-sectional area, A, of said column in square feet, and being equal at least to that defined by the equation $$N=\frac{96.7A}{L^{1.97}}$$

and less than that defined by the equation $$N=\frac{537A}{L^{1.20}}$$

passing the liquid hydrocarbons upwardly through said column at a velocity controlled below the column disrupting velocity whereby the hydrocarbons are effectively countercurrently contacted with the adsorbent, withdrawing the treated liquid hydrocarbons from the upper section of said column, passing the contacted adsorbent downwardly past but out of communication with said plenum space and withdrawing it from the lower end of the treating zone so as to cause the adsorbent to flow downwardly in said column.

2. A method for effecting countercurrent contact with a moving adsorbent and liquid hydrocarbons which remain in the liquid phase during the contacting which comprises, passing an adsorbent in palpable particle form downwardly as a column of gravitating particles through a confined treating zone, supplying the liquid hydrocarbon feed to at least one plenum space near the lower end of said column, ejecting the liquid feed from said plenum space through a plurality of spaced restricted passages from which the liquid discharges after substantial pressure drop as a plurality of separate high velocity streams, deflecting said streams to substantially reduce the linear velocity of the liquid and then directing the flow from said streams into said column at a plurality of locations uniformly distributed across the horizontal cross-sectional area thereof, passing the liquid hydrocarbons upwardly through said column at a velocity controlled below the column disrupting velocity whereby the hydrocarbons are effectively countercurrently contacted with the adsorbent, withdrawing the treated liquid hydrocarbons from the upper section of said column and withdrawing used adsorbent from the lower section of said column at a controlled throttled rate.

3. A method for decolorizing and treating oils of low asphalt content which comprises, maintaining a column of adsorbent of palpable particle form in an upper portion of an elongated treating housing, introducing the liquid oil feed into a single plenum space in said housing below the bottom of said bed, ejecting the liquid oil by means of pressure from said plenum space through a plurality of restricted passages distributed uniformly across the horizontal cross-sectional area of said housing, whereby a plurality of uniformly distributed streams are formed and directing said streams into the bottom of said column, passing the liquid oil upwardly through said column at a velocity controlled below the column disrupting velocity, whereby the oil is decolorized, withdrawing the decolorized oil from the upper section of said column, withdrawing spent adsorbent from the bottom of said column by passing it downwardly through but out of communication with said plenum space, so as to cause the adsorbent to flow downwardly in said column and replenishing said column at its upper end with fresh adsorbent.

4. A method for effecting countercurrent contact with a moving adsorbent and liquid hydrocarbons which are maintained as a liquid throughout the contacting which comprises, maintaining a body of liquid hydrocarbons in a lower portion of said treating zone, maintaining above and in liquid flow communication with said body a column of adsorbent of palpable particle form in an upper portion of said treating zone, the particles in said column being excluded from said body of liquid, withdrawing adsorbent from the lower section of said column while excluding entry of the particles into said body of liquid hydrocarbons whereby downward flow of adsorbent particles in said column is promoted, replenishing said column at its upper end with fresh adsorbent, supplying liquid hydrocarbons into said body so as to force liquid to flow upwardly into said column of adsorbent and interposing a substantial restriction on all of the liquid flow before the column of adsorbent is reached, said restriction being applied uniformly across the entire body of liquid, whereby the liquid flow above the restriction and as the liquid enters said adsorbent column is uniformly distributed over the entire cross-sectional area of said treating zone, passing the liquid hydrocarbons upwardly through said column at a velocity controlled below the column disrupting velocity whereby the hydrocarbons are effectively countercurrently contacted with the adsorbent, withdrawing the treated liquid hydrocarbons from the upper section of said adsorbent column.

5. A method for effecting countercurrent contact with a moving adsorbent and liquid hydrocarbons which are maintained as a liquid throughout the contacting which comprises, maintaining a body of liquid hydrocarbons in a lower portion of said treating zone, maintaining above and in liquid flow communication with said body a column of adsorbent of palpable particle form in an upper portion of said treating zone, the particles in said column being excluded from said body of liquid, withdrawing adsorbent from the lower section of said column while excluding entry of the particles into said body of liquid hydrocarbons whereby downward flow of adsorbent particles in said column is promoted, replenishing said column at its upper end with fresh adsorbent, supplying liquid hydrocarbons into the lower portion of said body so as to promote upward flow of the liquid, subdividing the flow at an intermediate common level in said body into a plurality of high velocity streams of restricted cross-section, said streams being uniformly spaced apart and distributed over the entire cross-sectional area of said treating zone, baffling each of said high velocity streams to disperse the flow and form a plurality of separate confined side by side streams of larger cross-section and lower velocity, said latter streams being uniformly distributed over the entire cross-sectional area of said treating zone, and flowing the oil from said last named streams into the bottom of said adsorbent column, passing the liquid hydrocarbons upwardly through said column at a velocity controlled below the column disrupting velocity whereby the hydrocarbons are effectively countercurrently contacted with the adsorbent, withdrawing the treated liquid hydrocarbons from the upper section of said adsorbent column.

6. An apparatus for countercurrent contacting of adsorbents of palpable particle form and liquid hydrocarbons which comprises, an upright treating vessel, means to introduce adsorbent into the upper section thereof and means to withdraw adsorbent from the lower section thereof, at least one member defining a plenum chamber in the lower section of said vessel, which plenum chamber communicates with the portion of said vessel thereabove only through a plurality of spaced restricted passageways, an impingement baffle supported immediately in front of and a short distance away from each restricted passageway, said baffle being of small cross-section relative to that of said vessel but being adapted to disperse the flow from said passageway, at least one foraminate member pervious to liquid flow and impervious to the adsorbent flow therethrough arranged in the lower section of said vessel in the vicinity of said restricted passageways to shield said passageways from the adsorbent material, means to supply liquid hydrocarbons to said plenum chamber and means to withdraw contacted liquid from the upper section of said treating vessel.

7. An apparatus for countercurrent contacting of adsorbents of palpable particle form and liquid hydrocarbons which comprises, an upright treating vessel, means to introduce adsorbent into the upper section thereof and means to withdraw adsorbent from the lower section thereof, a device to indicate the surface level of the column of adsorbent in the upper section of said vessel associated with said vessel at the desired surface level, at least one member defining a plenum chamber in the lower section of said vessel, which plenum chamber communicates with the portion of said vessel thereabove only through a plurality of spaced orifices of equal size which are uniformly distributed with respect to the horizontal cross-sectional area of said treating vessel, the number, N, of said orifices being at least as great as that defined by the equation $$N = \frac{96.7A}{L^{1.97}}$$

where L is the vertical distance in feet from said orifices to the level of said device for indicating the column surface level and A is the horizontal cross-sectional area of said vessel in square feet, an impingement baffle supported immediately in front and a short distance away from each orifice, said baffle being of small cross-section relative to that of said vessel but being adapted to disperse the flow from said passageway, at least one foraminate member pervious to liquid flow and impervious to the adsorbent flow therethrough arranged in the lower section of said vessel near said orifices to shield said orifices from the adsorbent material, means to supply liquid hydrocarbons to said plenum chamber and means to withdraw contacted liquid from the upper section of said treating vessel.

8. An apparatus for countercurrent contacting of adsorbents of palpable particle form and liquid hydrocarbons which comprises, an upright treating vessel, means to introduce adsorbent into the upper section thereof and means to withdraw contacted liquid from the upper section thereof, a device to measure the surface level of the adsorbent column in the upper section of said vessel associated with said vessel at the desired surface level, a screen extending across the lower section of said vessel a substantial distance above its lower end, a plurality of vertical intersecting partitions extending downwardly from said screen to a level short of the lower end of said vessel, said partitions being arranged to divide the portion of the vessel through which they extend into a plurality of separate vertical passages of approximately equal cross-section, a partition extending across the lower ends of said passages to define a liquid distributing chamber in the vessel therebelow, said partition having a plurality of spaced equal orifices therein, an orifice communicating with each of said vertical passages, the number of orifices and passages, N, being at least equal to $$N = \frac{96.7A}{L^{1.97}}$$

where A is the horizontal cross-sectional area of said vessel in square feet, and L is the vertical distance in feet from said screen to said level measuring device, means to supply liquid hydrocarbons below said partition, a plurality of uniformly spaced apart conduits for adsorbent withdrawal, said conduits extending through the liquid distributing space and terminating on their open upper ends shortly above said screen.

9. An apparatus for countercurrent contacting of adsorbents of palpable particle form and liquid hydrocarbons which comprises, an upright treating vessel, means to introduce adsorbent into the upper section thereof and means to withdraw adsorbent from the lower section thereof, a plurality of horizontally extending closed conduits arranged across the vessel in the lower section thereof, means to supply liquid feed to said conduits, a plurality of spaced orifices in said conduits, arranged to provide a uniform distribution of orifice area over the entire horizontal cross-section of said vessel, wire screening arranged to cover each of said orifices and a button type baffle attached to the screening over each orifice and means to withdraw contacted liquid from the upper section of said treating vessel.

10. An apparatus for countercurrent contacting of adsorbents of palpable particle form and liquid hydrocarbons which comprises, an upright treating vessel, means to introduce adsorbent into the upper section thereof and means to withdraw adsorbent from the lower section thereof, at least one member defining a liquid distributing space in the lower section of said vessel, which space is out of liquid flow communication with at least the portion of said vessel thereabove except through a plurality of spaced restricted passageways distributed uniformly with respect the vessel horizontal cross-section, an impingement baffle supported immediately in front of and a short distance away from each passageway, each baffle being of larger dimensions than the passageway but occupying only a small portion of the vessel cross-section, a foraminate partition across the lower section of said vessel a short distance above said distributing space defining member, said partition being pervious to liquid but impervious to the adsorbent, means to supply liquid to said distributing space and means to withdraw contacted liquid from the upper section of said treating vessel.

11. An apparatus for countercurrent contacting of adsorbents of palpable particle form and liquid hydrocarbons which comprises, an upright treating vessel, means to introduce adsorbent into the upper section thereof and means to withdraw contacted liquid from the upper section thereof, a partition extending transversely across said vessel in the lower section thereof providing a plenum chamber below the partition, means to supply liquid oil into said plenum chamber, a plurality of uniformly spaced conduits depending from said partition and extending downwardly through the plenum chamber and the bottom of said vessel for withdrawal of adsorbent from the portion of the vessel immediately above said partition, a plurality of restricted passageways for liquid flow uniformly spaced and distributed across said partition, a baffle member of larger cross-section than the passageway positioned a short distance above each restricted passageway and screening within said vessel above the partition arranged to shield said passageways from solid particles.

References Cited in the file of this patent
UNITED STATES PATENTS

| | | |
|---|---|---|
| 1,703,451 | McGill | Feb. 28, 1929 |
| 2,139,943 | Fenske et al. | Dec. 13, 1938 |
| 2,344,449 | Ogorzaly | Mar. 14, 1944 |
| 2,459,056 | Watson | Jan. 11, 1949 |
| 2,552,436 | Bennett et al. | May 8, 1951 |
| 2,564,717 | Olsen | Aug. 21, 1951 |
| 2,606,863 | Rehbein | Aug. 12, 1952 |
| 2,618,586 | Hendel | Nov. 18, 1952 |
| 2,696,305 | Slover | Dec. 7, 1954 |
| 2,701,786 | Evans et al. | Feb. 8, 1955 |